United States Patent
Jung (10) Patent No.: US 10,737,716 B2
(45) Date of Patent: Aug. 11, 2020

(54) STEERING CONTROL METHOD FOR VEHICLES

(71) Applicants: Hyundai Motor Company, Seoul (KR); Kia Motors Corporation, Seoul (KR)

(72) Inventor: Dae Suk Jung, Hoengcheon-myeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 434 days.

(21) Appl. No.: 15/684,788

(22) Filed: Aug. 23, 2017

(65) Prior Publication Data

US 2018/0273086 A1    Sep. 27, 2018

(30) Foreign Application Priority Data

Mar. 27, 2017 (KR) .......................... 10-2017-0038332

(51) Int. Cl.
  *B62D 5/04* (2006.01)
  *B62D 6/00* (2006.01)
  *B62D 6/02* (2006.01)

(52) U.S. Cl.
  CPC ........... *B62D 5/0466* (2013.01); *B62D 6/002* (2013.01); *B62D 6/02* (2013.01)

(58) Field of Classification Search
  None
  See application file for complete search history.

(56) References Cited

U.S. PATENT DOCUMENTS

| 4,681,183 A * | 7/1987 | Oshita .................. B62D 5/0466 180/446 |
| 4,865,148 A * | 9/1989 | Marumoto ......... B60G 17/0162 180/446 |
| 5,172,319 A * | 12/1992 | Shiraishi ................ B60K 28/16 180/197 |
| 5,388,658 A * | 2/1995 | Ando .................. B60K 23/0808 180/197 |
| 5,601,346 A * | 2/1997 | Lustenberger ........ B60T 8/1755 303/141 |
| 6,122,912 A * | 9/2000 | Phillips .................. B62D 5/065 60/413 |

(Continued)

FOREIGN PATENT DOCUMENTS

| JP | 2007-38702 A | 2/2007 |
| JP | 2007-170274 A | 7/2007 |

(Continued)

*Primary Examiner* — Nicholas K Wiltey
(74) *Attorney, Agent, or Firm* — Morgan, Lewis & Bockius LLP (57) ABSTRACT

A steering control method for a vehicle, may include determining, by a controller, whether or not a vehicle is in a high-speed turning driving condition based on factors reflecting a driving state of the vehicle; determining, by the controller, whether or not a rapid acceleration is occurring in the vehicle when the controller determines that the vehicle is in the high-speed turning driving condition; and providing, by the controller, restoration compensation torque to a steering restoration direction of the vehicle by use of a steering motor when the controller determines that the rapid acceleration is occurring.

7 Claims, 6 Drawing Sheets

(56) References Cited

U.S. PATENT DOCUMENTS

| | | | | |
|---|---|---|---|---|
| 6,152,254 A * | 11/2000 | Phillips | | B62D 5/0463 180/421 |
| 2001/0027364 A1 * | 10/2001 | Matsuoka | | B62D 5/046 701/41 |
| 2002/0013647 A1 * | 1/2002 | Kawazoe | | B62D 1/28 701/41 |
| 2002/0125063 A1 * | 9/2002 | Kurishige | | B62D 5/0466 180/443 |
| 2003/0078712 A1 * | 4/2003 | Shimakage | | B62D 1/286 701/41 |
| 2004/0064228 A1 * | 4/2004 | Yamamoto | | B62D 5/0457 701/41 |
| 2004/0102894 A1 * | 5/2004 | Holler | | B60T 8/246 701/124 |
| 2005/0057347 A1 * | 3/2005 | Baader | | B60C 23/20 340/442 |
| 2005/0206235 A1 * | 9/2005 | Tseng | | B60T 8/1708 303/146 |
| 2005/0247509 A1 * | 11/2005 | Schneider | | B62D 6/02 180/402 |
| 2007/0062755 A1 * | 3/2007 | Krieger | | B62D 5/0472 180/446 |
| 2010/0131146 A1 * | 5/2010 | Nardi | | B60T 8/172 701/31.4 |
| 2010/0131229 A1 * | 5/2010 | Nardi | | B60T 8/172 702/142 |
| 2011/0022268 A1 * | 1/2011 | Kojo | | B62D 5/008 701/41 |
| 2011/0196568 A1 * | 8/2011 | Nickolaou | | B60W 50/0098 701/31.4 |
| 2011/0307129 A1 * | 12/2011 | Yu | | B60K 7/0007 701/22 |
| 2012/0083973 A1 * | 4/2012 | Araki | | B62K 21/00 701/43 |
| 2012/0109483 A1 * | 5/2012 | O'Dea | | B60T 8/1755 701/71 |
| 2013/0073161 A1 * | 3/2013 | Tsushima | | B60K 17/344 701/69 |
| 2013/0131947 A1 * | 5/2013 | Takahashi | | B60T 7/18 701/70 |
| 2014/0358370 A1 * | 12/2014 | Kikuchi | | B60G 17/0165 701/37 |
| 2015/0081170 A1 * | 3/2015 | Kikuchi | | B60G 17/018 701/37 |
| 2015/0158496 A1 * | 6/2015 | Cassar | | B60W 40/109 702/150 |
| 2015/0158524 A1 * | 6/2015 | Lee | | B62D 15/025 701/41 |
| 2015/0284022 A1 * | 10/2015 | Kudo | | B62D 5/0472 701/41 |
| 2016/0018821 A1 * | 1/2016 | Akita | | G05D 1/0022 701/2 |
| 2016/0159389 A1 * | 6/2016 | Kuramitsu | | B62D 5/0484 180/446 |
| 2016/0318546 A1 * | 11/2016 | Lee | | B62D 5/0466 |
| 2017/0096166 A1 * | 4/2017 | Kataoka | | B62D 5/008 |
| 2017/0113717 A1 * | 4/2017 | Ko | | B62D 5/0472 |
| 2017/0183027 A1 * | 6/2017 | Kimura | | B62D 5/0463 |
| 2017/0210414 A1 * | 7/2017 | Sato | | B62D 6/003 |
| 2017/0297611 A1 * | 10/2017 | Raad | | B62D 6/04 |
| 2017/0358963 A1 * | 12/2017 | Lim | | H02K 5/128 |
| 2018/0119808 A1 * | 5/2018 | Miller | | B60W 10/188 |
| 2018/0162395 A1 * | 6/2018 | Mukai | | B60W 30/143 |
| 2018/0257631 A1 * | 9/2018 | Fodor | | B60W 20/10 |
| 2018/0273086 A1 * | 9/2018 | Jung | | B62D 5/0466 |
| 2019/0389448 A1 * | 12/2019 | Jung | | B62D 6/008 |

FOREIGN PATENT DOCUMENTS

| | | |
|---|---|---|
| JP | 2008-273246 A | 11/2008 |
| JP | 2011-105082 A | 6/2011 |
| JP | 2013-023018 A | 2/2013 |
| JP | 2015-229385 A | 12/2015 |
| JP | 2017-105424 A | 6/2017 |
| KR | 10-2013-0030634 A | 3/2013 |
| KR | 10-2013-0066116 A | 6/2013 |
| KR | 10-2014-0025964 A | 3/2014 |
| KR | 10-2017-0035559 A | 3/2017 |

\* cited by examiner

STEERING CONTROL METHOD FOR VEHICLES

CROSS-REFERENCE(S) TO RELATED APPLICATIONS

The present application claims priority to Korean Patent Application No. 10-2017-0038332, filed on Mar. 27, 2017, the entire contents of which is incorporated herein for all purposes by the present reference.

BACKGROUND OF THE INVENTION

Field of the Invention

The present invention generally relates to a steering control method for a vehicle, more particularly a steering control method which improves the manipulability and running stability of a vehicle by improving a steering restoration performance thereof when a vehicle driver wants to escape from a turning path during a high speed turning driving condition.

Description of Related Art

With high performance vehicles including racing cars that use high grip tires and high output engines, new problems have arisen in terms of steering operations since the vehicles may have to suddenly turn left and/or right while driving at a rapid speed.

In other words, in high performance vehicles, when a driver wants to escape from a turning path through rapid acceleration while turning at a high speed, a lateral input load that has an absolute effect on the steering restoration is reduced due to a tire characteristic.

When a degree of the reduced lateral input load is greater than the self-friction of the steering system, no problem arises. However, when the degree of the reduced lateral input load is less than the self-friction of the steering system, a tie rod restoration load is decreased, and a reaction force of a steering wheel is also lost. Thus, steering restoration becomes impossible.

Figure 1:
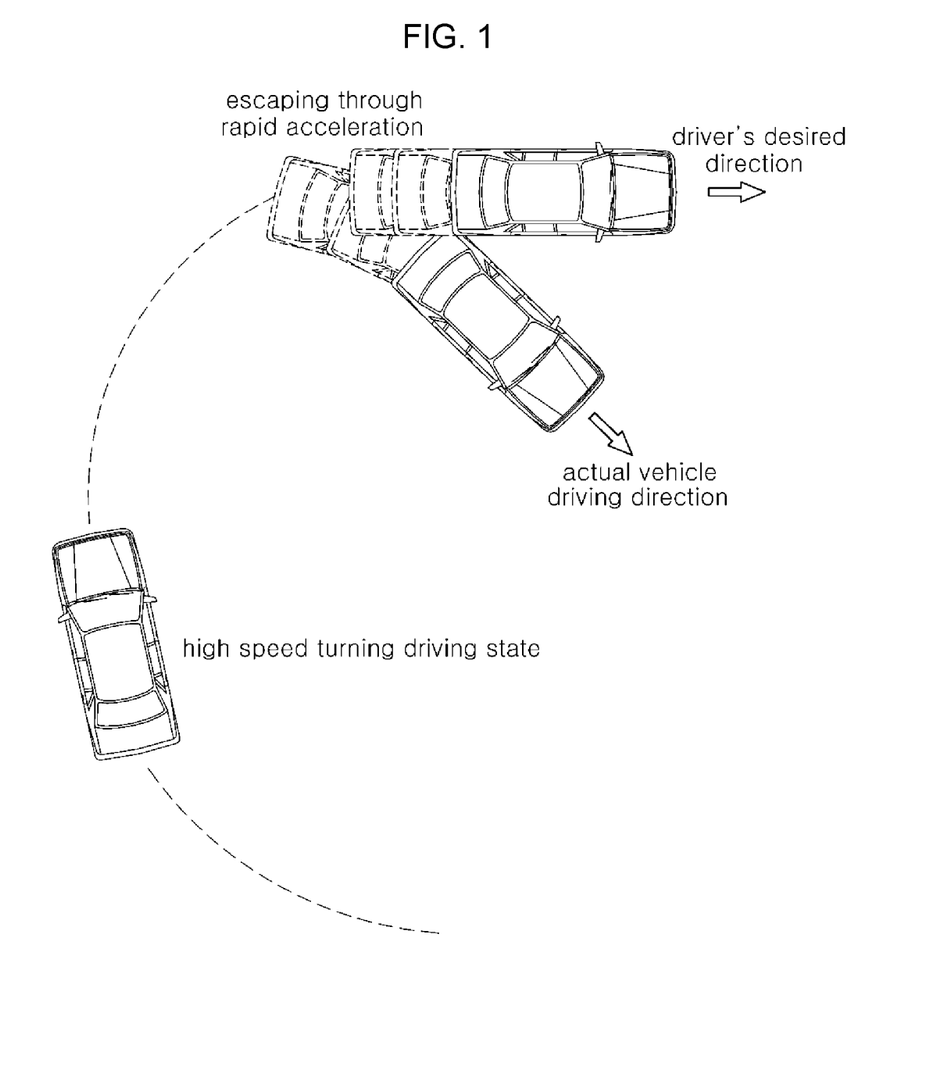
FIG. 1 is a view showing a problematic situation in which steering restoration is impossible when a vehicle driver wants to escape from a turning path through an acceleration during a high speed turning driving condition.

Accordingly, as shown in FIG. 1, a vehicle is not able to drive toward a rapid acceleration escaping direction according to a user's intention, thus an over steer phenomenon may occur or the vehicle may spin since the tires may slip.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a steering control method for a vehicle, whereby the method improves the manipulability and running stability of a vehicle by improving a steering recovering performance when a vehicle driver wants to escape from a turning path during a high speed turning driving condition.

According to various aspects of According to various aspects of the present invention, there is provided a steering control method for a vehicle, the method including: determining by a controller, whether or not a vehicle is in a high-speed turning driving condition based on factors reflecting a driving state of the vehicle; determining, by the controller, whether or not a rapid acceleration is occurring in the vehicle when the controller determines that the vehicle is in the high-speed turning driving condition; and providing, by the controller, a restoration compensation torque to a steering restoration direction of the vehicle using a steering motor when the controller determines that the rapid acceleration is occurring.

The factors used for determining whether or not the vehicle is in the high-speed turning driving condition may be a vehicle speed, a steering angle, and a lateral acceleration; and factors used for determining whether or not the rapid acceleration is occurring are an engine RPM, a vehicle driving torque, an opening ratio by an accelerator pedal, and a torque transmitted to an external wheel during turning.

The method may further include: determining whether or not the vehicle has escaped from the high-speed turning driving condition after verification of the compensation torque applied; and releasing the provision of the restoration compensation torque when it is determined that the vehicle has escaped from the high-speed turning driving condition.

A factor used for determining whether or not the vehicle has escaped from the high-speed turning driving condition may be any one of a vehicle speed, a steering angle, a vehicle driving torque, and a torque transmitted to an external wheel during turning.

In the providing of the restoration compensation torque, the restoration compensation torque may be determined by relations of a vehicle speed, a steering angle, a steering angular velocity, a steering torque, and a vehicle driving torque.

The restoration compensation torque may be determined by multiplying a restoration amount determined by a relation between the vehicle speed and the steering angle by a first gain value determined according to a magnitude of the steering angular velocity, a second gain value determined according to a magnitude of the steering torque, and a third gain value determined according to a relation between a magnitude of engine torque and a gear stage.

The restoration compensation torque may be determined by relations of a vehicle speed, a steering angle, a lateral acceleration, a torque transmitted to an external wheel during turning, an engine torque, and an engine RPM.

The restoration compensation torque may be determined by multiplying a restoration amount that is determined by a relation between the vehicle speed and the steering angle by a first gain value that is determined according to a magnitude of the lateral acceleration in, a second gain value that is determined according to a magnitude of the torque transmitted to the external wheel during turning, a third gain value that is determined according to a magnitude of the engine torque or a percentage of the current engine torque based the maximum engine torque, and a fourth gain value that is determined according to a magnitude of the engine RPM.

In the providing of the restoration compensation torque, the restoration compensation torque may be determined by a relation between the lateral acceleration and the engine torque.

According to an exemplary embodiment of the present invention, when a vehicle driver wants to escape from a turning path through rapid acceleration during a high speed turning driving condition, compensation torque is provided to a steering restoration direction of the vehicle using a steering motor. Accordingly, the manipulability and running stability of the vehicle are improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A steering control method of the present invention is configured to include: determining a high-speed turning driving condition; determining a rapid acceleration; and providing a restoration compensation torque.

The present invention will be described in detail with reference to FIG. 2 and FIG. 3. First, in the determining of a high speed turning condition, whether or not the vehicle is in a high-speed turning driving condition is determined based on factors that reflect an operational state of the vehicle.

Herein, the factors used for determining whether or not the vehicle is in the high-speed turning driving condition may be a vehicle speed, a steering angle, and a lateral acceleration.

The factors may be measured by a vehicle speed detector, a steering angle detector, and a lateral acceleration detector. Values measured by the above detectors may be input to a controller 3.

For example, when the vehicle speed is equal to or greater than a predetermined vehicle speed, the absolute value of the steering angle is equal to or greater than a predetermined value, and the lateral acceleration is equal to or greater than a predetermined value, the controller 3 determines that the vehicle is in the high speed turning driving condition.

In the determining of a rapid acceleration, whether or not a rapid acceleration is occurring in the vehicle is determined when it is established that the vehicle is in the high speed turning driving condition.

Herein, factors used for determining whether or not the rapid acceleration is occurring in the vehicle may be an engine RPM, a vehicle driving torque, an open ratio by an accelerator pedal, and a torque transmitted to an external wheel during turning.

Among the above factors, the vehicle driving torque may be determined by 'engine torque×gain for gear stage', and may be determined by the controller 3 by receiving information from an engine and a transmission. The open ratio by the accelerator pedal may be measured through an accelerator pedal sensor (APS), and the torque transmitted to the external wheel during turning may be obtained through an electronic-limited slip differential (E-LSD).

For example, when the engine RPM is equal to or greater than a predetermined value, the vehicle driving torque is equal to or greater than a predetermined value, the open ratio by the accelerator pedal is equal to or greater than a predetermined value, and the torque transmitted to the external wheel during turning is equal to or greater than a predetermined value, the controller 3 may determine that a rapid acceleration is occurring in the vehicle during the high-speed turning driving condition.

As such, in the providing of the restoration compensation torque, the restoration compensation torque may be provided to a steering restoration direction using a steering motor 1 when the controller 3 determines that the rapid acceleration is occurring in the vehicle during the high-speed turning driving condition.

For example, the present invention is suitable for a vehicle in which a motor-driven power steering (MDPS) system that assists a driver's steering force using a driving force of an electric motor is integrated, and the steering motor 1 may be a steering motor that is used in the MDPS system.

In other words, according to the above configuration, when a vehicle driver wants to escape from a turning path through rapid acceleration during the high speed turning driving condition, the compensation torque is provided at an opposite direction to a turning direction of the vehicle, in other words, to a steering restoration direction, by use of the steering motor 1. Thus, the steering restoration performance of the vehicle improves. Accordingly, the manipulability and running stability of the vehicle are improved.

In addition, after providing the restoration compensation torque, the steering control method may further include a step of determining whether or not the vehicle has escaped from the high-speed turning driving condition based on factors that reflect an operational state of the vehicle.

In addition, the steering control method may further include releasing the applied restoration compensation torque when the steering control method determines that the vehicle has escaped from the high-speed turning driving condition.

Herein, a factor used for determining whether or not the vehicle has escaped from the high-speed turning driving condition may be any one of a vehicle speed, a steering angle, a vehicle driving torque, and a torque transmitted to an external wheel during turning. When any one of the above factors satisfies a releasing condition, the provision of the restoration compensation torque is released.

For example, when the vehicle speed is less than a predetermined vehicle speed, the absolute value of the steering angle is less than a predetermined value, the vehicle driving torque is less than a predetermined value, or the torque transmitted to the external wheel during turning is less than a predetermined value, the controller 3 may determine that the vehicle has currently escaped from the high-speed turning driving condition.

However, since all of the vehicle speed, the steering angle, the vehicle driving torque, and the torque transmitted to the external wheel during turning have hysteresis features between the respective output values corresponding to a compensation torque entry condition and the respective output values corresponding to a compensation torque release condition, repetitive entry and release of the restoration compensation torque at the boundary of the output values may be prevented.

Accordingly, the restoration compensation torque entry condition and release condition may be summarized as follows.

TABLE 1

|  | Compensation torque entry condition | Compensation torque release condition |
| --- | --- | --- |
| Vehicle speed | ≥A | <A − A' |
| Steering angle | ≥B | <B − B' |
| Lateral acceleration | ≥C | — |
| Engine RPM | ≥D | — |
| Vehicle driving torque (engine torque * gain for gear stage) | ≥E | <E − E' |
| Open ratio by acceleration pedal | ≥F | — |
| Torque transmitted to an external wheel during turning | ≥G | <G − G' |

Figure 4:
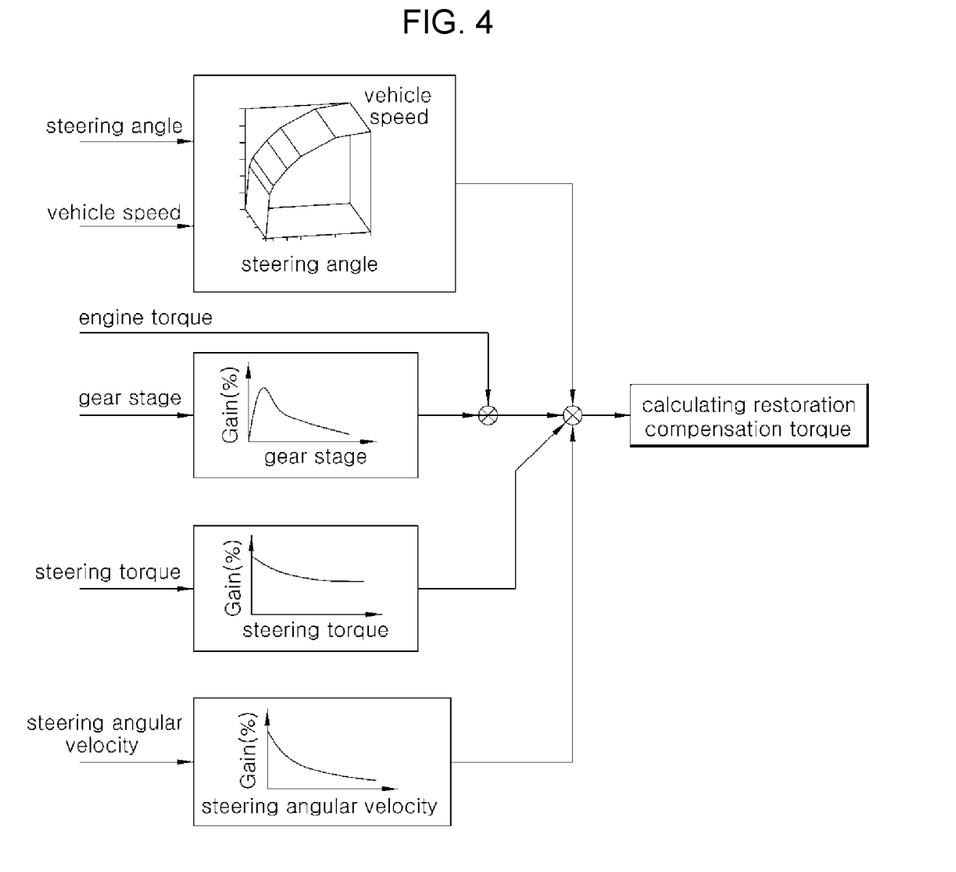
FIG. 4 is a view showing various exemplary embodiments for determining a restoration compensation torque according to an exemplary embodiment of the present invention.

Meanwhile, in the providing of the restoration compensation torque, as various exemplary embodiments method for determining the restoration compensation torque, the restoration compensation torque may be determined by relations of a vehicle speed, a steering angle, a steering angular velocity, a steering torque, and a vehicle driving torque.

Referring to FIG. 4, the restoration compensation torque may be determined by multiplying a restoration amount that is determined by a restoration amount map obtained by a relation between the vehicle speed and the steering angle by a first gain value determined according to a magnitude of the steering angular velocity, a second gain value determined according to a magnitude of the steering torque, and a third gain value determined by a relation between a magnitude of the engine torque and a gear stage.

Herein, the first gain value may be 0≤first gain value≤1, the second gain value may be 0≤second gain value≤1, and the third gain value may be 0≤third gain value≤1.

In detail, in the case of the first gain value, the restoration amount may be controlled to be decreased since the first gain value becomes smaller as the steering angular velocity becomes greater. In the case of the second gain value, the restoration amount may be controlled to be decreased since the second gain value becomes smaller as the steering torque becomes greater.

In addition, in the case of the third gain value, the restoration amount may be increased or decreased for each gear stage by setting the third gain value to be increased until a specific lower gear stage, and by setting the third gain value to be decreased from a gear stage that exceeds the specified lower gear stage.

Figure 5:
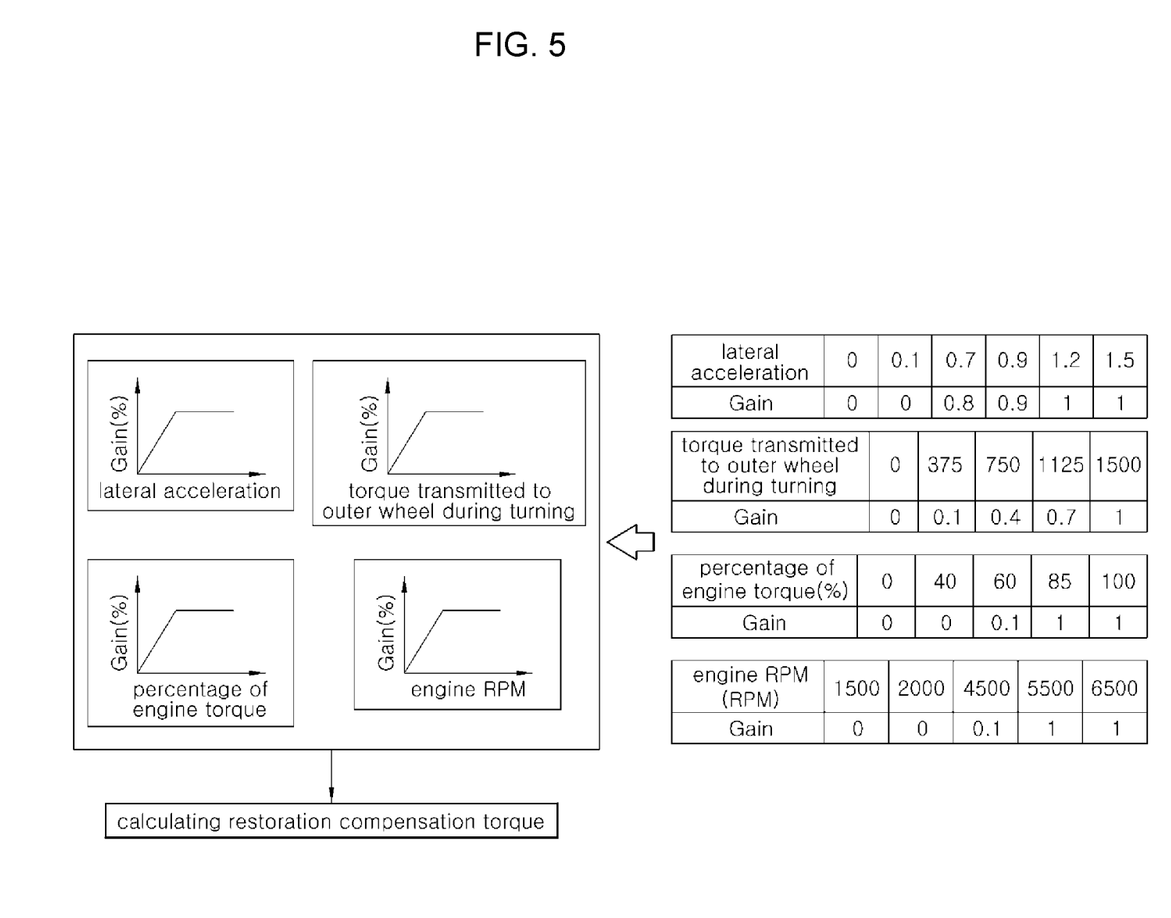
FIG. 5 is a view showing various exemplary embodiments for determining restoration compensation torque according to an exemplary embodiment of the present invention.

In addition, in the providing of the restoration compensation torque, as various exemplary embodiments method for determining the restoration compensation torque, the restoration compensation torque may be determined by relations of a vehicle speed, a steering angle, a lateral acceleration, a torque transmitted to the external wheel during turning, an engine torque, and an engine RPM.

Referring to FIG. 5, the restoration compensation torque is determined by multiplying a restoration amount that is determined by a restoration amount map obtained by a relation between the vehicle speed and the steering angle by a first gain value that is determined according to a magnitude of the lateral acceleration, a second gain value that is determined according to a magnitude of the torque transmitted to the external wheel during turning, a third gain value that is determined according to a magnitude of the engine torque or a percentage of the current engine torque based on the maximum engine torque, and a fourth gain value that is determined according to a magnitude of the engine RPM.

However, the third gain value may be determined according to a magnitude of the engine torque.

Herein, the first gain value may be 0≤first gain value≤1, the second gain value may be 0≤second gain value≤1, the third value may be 0≤third gain value≤1, and the fourth value may be 0≤fourth gain value≤1.

In detail, the first gain value may be determined to be increased as the lateral acceleration becomes larger, the second gain value may be determined to be increased as the torque transmitted to the external wheel during turning becomes larger, the third gain value may be determined to be increased as the engine torque or the percentage of the current engine torque becomes larger, and the fourth gain value may be determined to be increased as the engine RPM becomes larger.

Figure 6:
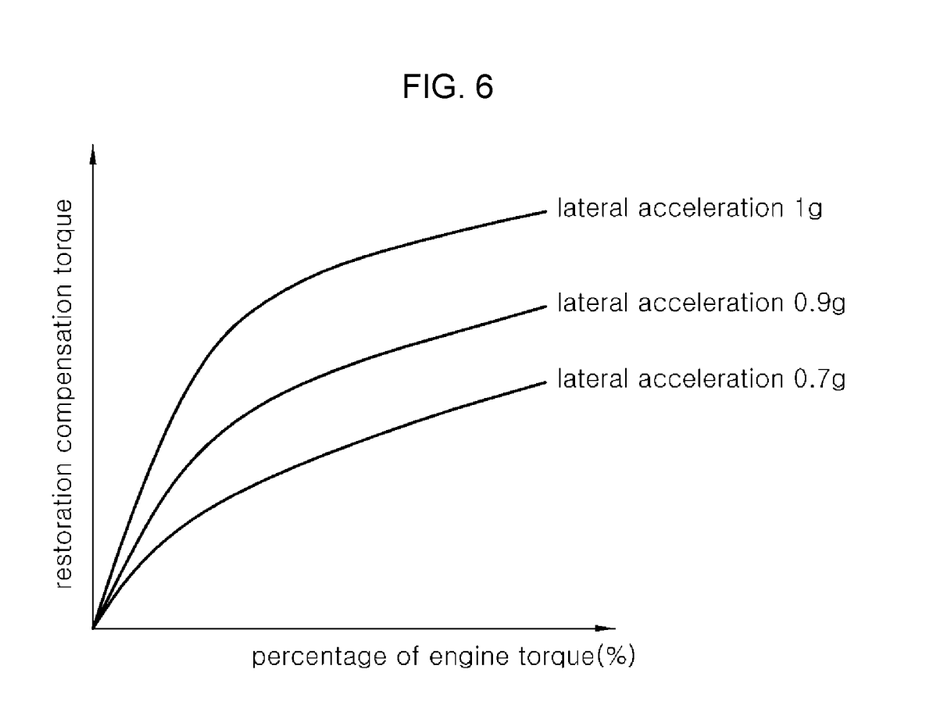
FIG. 6 is a view showing various exemplary embodiments for determining restoration compensation torque according to an exemplary embodiment of the present invention.

In addition, in providing the restoration compensation torque, as various exemplary embodiments method for determining the restoration compensation torque, the restoration compensation torque may be determined by a relation between the lateral acceleration and the engine torque.

Referring to FIG. 6, the restoration compensation torque may be determined by a restoration amount map that is obtained by a relation between the lateral acceleration and the engine torque determined according to a percentage magnitude of the current engine torque based on the maximum engine torque.

Herein, the restoration compensation torque may be determined to be increased as the lateral acceleration becomes larger. In addition, the restoration compensation torque may be also determined to be increased as a percentage value of the engine torque becomes larger.

Hereinbelow, a control flowchart of the steering control method according to an exemplary embodiment of the present invention will be described.

Figure 2:
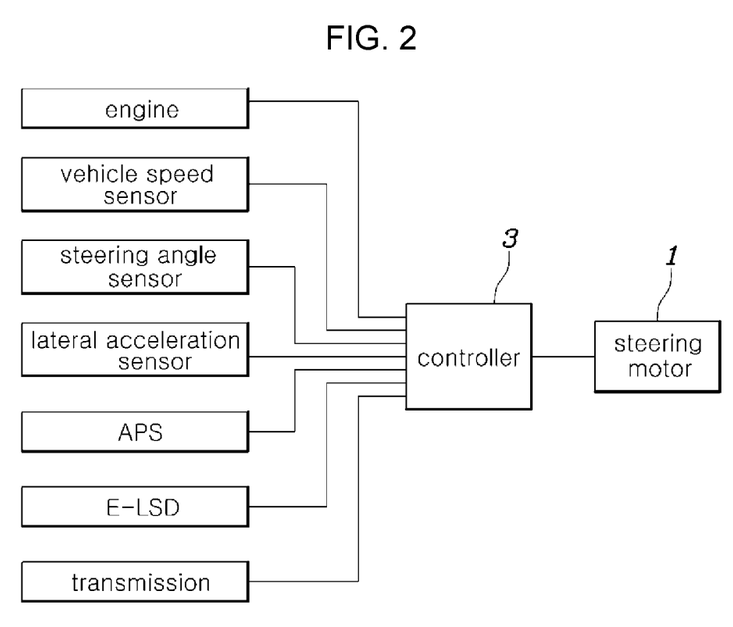
FIG. 2 is a schematic view showing the whole configuration of a steering system for steering controlling according to an exemplary embodiment of the present invention.
Figure 3:
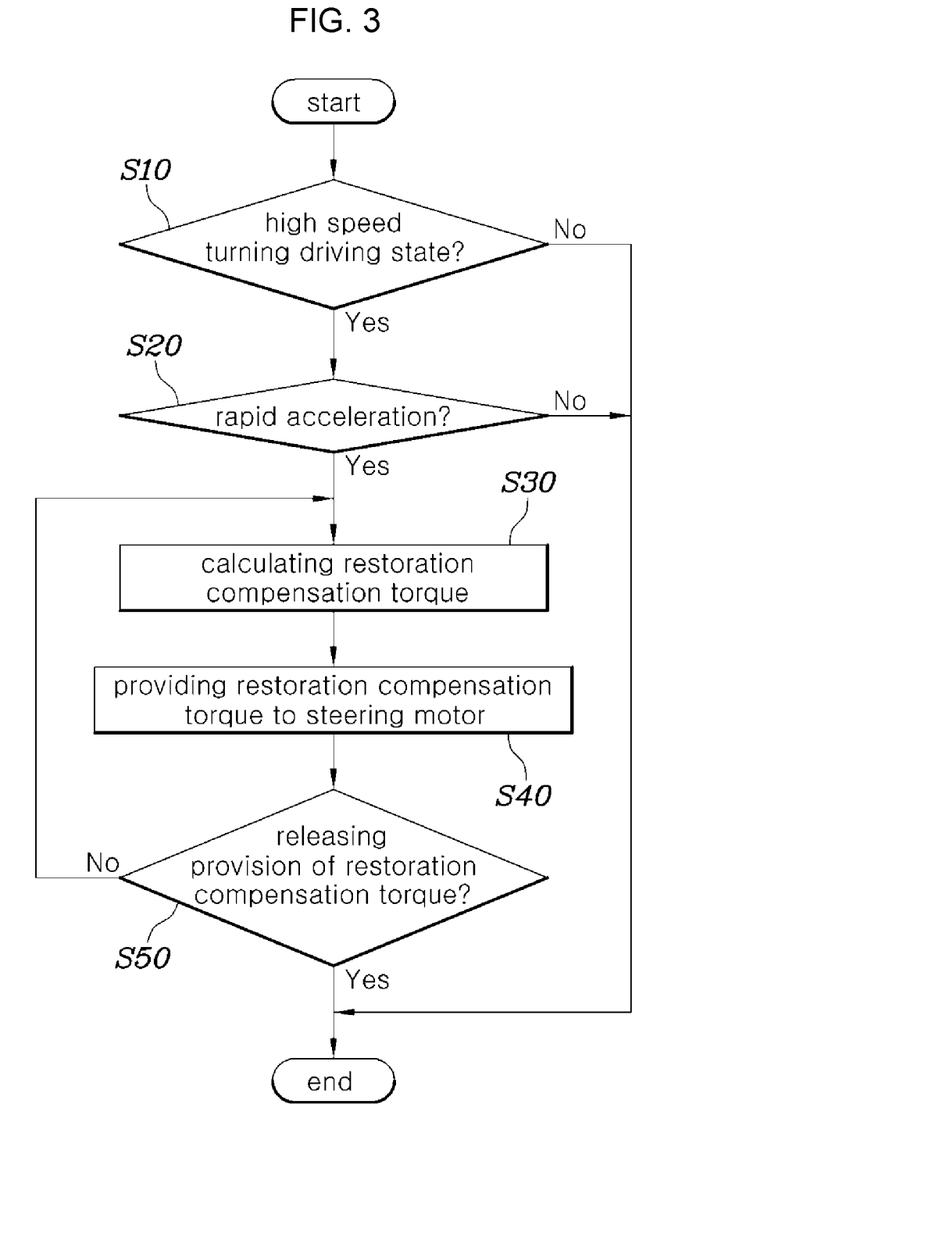
FIG. 3 is a view showing a control flowchart of a steering control method according to an exemplary embodiment of the present invention.

Referring to FIG. 2, in step S10, while a driver drives a vehicle, the controller 3 is configured to receive a vehicle speed, a steering angle, and a lateral acceleration from various detectors disposed in the vehicle. As such, the controller 3 determines that the vehicle is in a high speed turning driving condition when the all of the above values exceed their respective predetermined values.

When it is determined that the vehicle is in the high speed turning driving condition in step S10, the controller 3 receives an input of an engine RPM, a vehicle driving torque, an open ratio by an accelerator pedal, and a torque transmitted to an external wheel during turning, and determines that a rapid acceleration of the current vehicle is occurring during the high speed turning driving condition when all of the received input values exceed their respective predetermined values in step S20.

When the controller 3 determines that the rapid acceleration is occurring in the current vehicle in step S20, the controller 3 determines that a compensation entry condition is satisfied, and determines the restoration compensation torque to provide to a steering restoration direction of the vehicle in step S30.

Herein, the restoration compensation torque may be determined by relations of a vehicle speed, a steering angle, a steering angular velocity, a steering torque, and vehicle a driving torque.

In addition, the restoration compensation torque may be determined by relations of a vehicle speed, a steering angle, a lateral acceleration, a torque (E-LSD) transmitted to the external wheel during turning, an engine torque, and an engine RPM.

In addition, the restoration compensation torque may be determined by relations of a vehicle speed, a steering angle, a lateral acceleration, and an engine torque.

As such, the controller 3 is configured to operate and control the steering motor 1 so that the restoration compensation torque determined in step S30 is provided to the steering restoration direction of the vehicle in step S40. In other words, the restoration compensation torque is provided to the steering restoration direction of the vehicle by operating the steering motor 1.

As such, in step S40, the controller 3 receives an input of a vehicle speed, a steering angle, a vehicle driving torque, and the torque transmitted to an external wheel during turning, and determines whether or not any one of the above factors is less than a predetermined value in step S50. When any one of the above factors is less than the predetermined value, the controller 3 determines that a compensation torque release condition is satisfied, and releases the applied restoration compensation torque.

As described above, the present invention improves the steering restoration performance of a vehicle by providing a compensation torque to a steering restoration direction of the vehicle using a steering motor 1 when a vehicle driver wants to escape from a turning path through rapid acceleration during a high speed turning driving condition. Thus, the manipulability and running stability of the vehicle are improved.

For convenience in explanation and accurate definition in the appended claims, the terms "upper", "lower", "internal", "outer", "up", "down", "upwards", "downwards", "front", "rear", "back", "inside", "outside", "inwards", "outwards", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering control method for a vehicle, the method comprising:
   determining, by a controller, whether the vehicle is in a turning driving condition based on factors reflecting a driving state of the vehicle;
   determining, by the controller, whether an acceleration is occurring in the vehicle when the controller determines that the vehicle is in the turning driving condition; and
   providing, by the controller, a restoration compensation torque to a steering restoration direction of the vehicle using a steering motor when the controller determines that the acceleration is occurring,
   wherein in the providing of the restoration compensation torque, the restoration compensation torque is determined by relations of a vehicle speed, a steering angle, a steering angular velocity, a steering torque, and a vehicle driving torque, and
   wherein the restoration compensation torque is determined by multiplying a restoration amount determined by a relation between the vehicle speed and the steering angle by a first gain value determined according to a magnitude of the steering angular velocity, a second gain value determined according to a magnitude of the steering torque, and a third gain value determined according to a relation between a magnitude of an engine torque and a gear stage.

2. The method of claim 1, wherein the factors used for determining whether the vehicle is in the turning driving condition are the vehicle speed, the steering angle, and a lateral acceleration; and factors used for determining whether the acceleration is occurring are an engine RPM, the vehicle driving torque, an opening ratio by an accelerator pedal, and a torque transmitted to an external wheel during turning.

3. The method of claim 1, further including:
   determining whether the vehicle has escaped from the turning driving condition after verification of the restoration compensation torque applied; and
   releasing the applied restoration compensation torque when the vehicle is determined to have escaped from the turning driving condition.

4. The method of claim 3, wherein a factor used for determining whether the vehicle has escaped from the turning driving condition is one of the vehicle speed, the steering angle, the vehicle driving torque, and a torque transmitted to an external wheel during turning.

5. The method of claim 1, wherein in the providing of the restoration compensation torque, the restoration compensation torque is determined by relations of the vehicle speed, the steering angle, a lateral acceleration, a torque transmitted to an external wheel during turning, the engine torque, and an engine RPM.

6. The method of claim 5, wherein the restoration compensation torque is determined by multiplying a restoration amount that determined by a relation between the vehicle speed and the steering angle by a fourth gain value that is determined according to a magnitude of the lateral acceleration, a fifth gain value that is determined according to a magnitude of the torque transmitted to the external wheel during turning, a sixth gain value that is determined according to a magnitude of the engine torque or a percentage of a current engine torque based a maximum engine torque, and a seventh gain value that is determined according to a magnitude of the engine RPM.

7. The method of claim 1, wherein in the providing of the restoration compensation torque, the restoration compensation torque is determined by a relation between a lateral acceleration and the engine torque.

* * * * *